UNITED STATES PATENT OFFICE.

WINFIELD M. KIMBERLIN, OF AKRON, OHIO, ASSIGNOR TO THE GOODYEAR TIRE & RUBBER COMPANY, OF AKRON, OHIO.

PROCESS OF CEMENTING SUBSTANCES.

SPECIFICATION forming part of Letters Patent No. 725,094, dated April 14, 1903.

Application filed September 10, 1902. Serial No. 122,809. (No specimens.)

*To all whom it may concern:*

Be it known that I, WINFIELD M. KIMBERLIN, a citizen of the United States, residing at Akron, in the county of Summit and State of Ohio, have invented a certain new and useful Improvement in Processes of Cementing Together Various Substances, of which the following is a complete specification.

This invention has relation to a process of uniting together permanently various articles and materials, as rubber, leather, fabrics, wood, iron, &c., with a view to their ultimate use in this united condition and is especially adapted for uniting horseshoe-pads, belting, &c.; and it has for its object the production of a simple and rapid process consisting of a series of successive steps or operations to make a permanent secure joint that can be completed more rapidly, quickly, and economically than by any known process.

With this object in view my invention consists in first roughening, where practicable, the surfaces of the objects to be united, then coating them with a rubber or gutta-percha cement, the solvent of which shall be one of the well-known solvents of caoutchouc or gutta-percha—as, for instance, naphtha, benzene, carbon bisulfid, chloroform, ether, or some of the coal-tar products. These coated surfaces are then preferably, though not absolutely, necessarily permitted to dry. The coating thus produced is then either dipped or covered with one of any of the well-known solutions capable of what is known as "cold-curing rubber"—such, for instance, as chlorid of sulfur. After this moistening of the surfaces by this curing solution the adjacent treated surfaces are placed against each other and subjected to such pressure and for such a time as is necessary to cause them to unite. The result from this process just described is a joint between the material or articles of such strength that in substantially all cases the materials themselves will be torn asunder before the joint between them can be opened.

The joint thus made is absolutely waterproof and can be used where the ordinary cement process heretofore known for uniting these substances is wholly inapplicable.

In joints heretofore made by rubber cements one of two methods is used. Either the unvulcanized cement is used, which depends on its sticky quality alone to unite the parts, or else a cement is used which absolutely involves using a heating process to cause it to adhere in which the heat becomes a necessary element in order to vulcanize or cure the rubber in the cement to cause it to unite the adjoining substances which it is intended to fasten together. In this process, however, the bath or application of a curing solution to the cement before the contacting surfaces are united causes the necessary vulcanization of the rubber or at least an equivalent vulcanization, causing them to unite upon the application of the pressure.

I do not customarily use heat in carrying out this process; but I do not wish to limit myself to the absolute exclusion of heat.

What I claim is—

1. The process of uniting substances, consisting of first coating the surfaces to be united with a rubber or gutta-percha cement whose solvent is one of the solvents of caoutchouc or gutta-percha, treating the coating of cement with a curing solution, and then pressing the surfaces thus treated against one another.

2. The process of uniting substances which consists in coating the surfaces to be united with a cement and treating said cement-coated surfaces with a curing solution and pressing said coated surfaces against one another.

3. A process for uniting substances which consists in subjecting cement-covered surfaces to a curing solution and following said treatment with pressure sufficient to cause them to cohere.

4. A process of uniting substances which consists in roughening the surfaces to be united and placing thereon a cement, applying a curing solution thereto and applying pressure to cause said surfaces to unite.

5. The process of uniting substances which consists in interposing between them a cement, treating said cement with a curing solution, and pressing said substances toward each other upon said cement.

6. The process of uniting substances which consists in interposing between them a cement, previously treating said cement with a curing solution and pressing said substances upon said cement.

In testimony that I claim the above I hereunto set my hand in the presence of two subscribing witnesses.

WINFIELD M. KIMBERLIN.

In presence of—
C. E. HUMPHREY,
C. P. HUMPHREY.